United States Patent [19]

Iino et al.

[11] Patent Number: 4,916,900
[45] Date of Patent: Apr. 17, 1990

[54] HYDRAULICALLY OPERATED CONTINUOUSLY VARIABLE TRANSMISSION

[75] Inventors: Takashi Iino; Tsuneaki Seino; Eiichiro Kawahara, all of Saitama, Japan

[73] Assignee: Honda Giken Kogyo Kabushiki Kaisha, Tokyo, Japan

[21] Appl. No.: 132,414

[22] Filed: Dec. 14, 1987

[30] Foreign Application Priority Data

Dec. 12, 1986 [JP] Japan ................ 61-296240

[51] Int. Cl.$^4$ ............................. F16D 39/00
[52] U.S. Cl. ........................ 60/489; 60/487; 91/506
[58] Field of Search .................. 60/487–492; 91/488, 499, 505, 506

[56] References Cited

U.S. PATENT DOCUMENTS

| | | |
|---|---|---|
| Re. 24,317 | 5/1957 | Schott . |
| 2,777,286 | 1/1957 | Badalini . |
| 3,211,419 | 10/1965 | Klinger-Lohr ............ 251/186 |
| 3,364,679 | 1/1968 | Osojnak . |
| 3,464,206 | 9/1969 | Badalini . |
| 4,444,093 | 4/1984 | Koga et al. ............... 91/507 X |
| 4,478,134 | 10/1984 | Kawahara et al. ......... 91/488 |
| 4,646,520 | 3/1987 | Furumoto . |
| 4,781,002 | 11/1988 | Hayashi . |

FOREIGN PATENT DOCUMENTS

| | | |
|---|---|---|
| 3401381 | 7/1985 | Fed. Rep. of Germany . |
| 54-134252 | 10/1979 | Japan . |
| 55-1290 | 1/1980 | Japan . |
| 1294 | 1/1980 | Japan ............... 60/487 |
| 55-14312 | 1/1980 | Japan . |
| 56-50142 | 11/1981 | Japan . |
| 57-70968 | 5/1982 | Japan . |
| 57-76357 | 5/1982 | Japan . |
| 61-37540 | 2/1986 | Japan . |
| 473997 | 6/1969 | Switzerland . |

Primary Examiner—Edward K. Look
Attorney, Agent, or Firm—Lyon & Lyon

[57] ABSTRACT

A hydraulically operated continuously variable transmission for an automobile includes a hydraulic pump coupled to an input shaft and having an outlet port, a hydraulic motor coupled to an output shaft, at least one of the hydraulic pump and the hydraulic motor being of the variable-displacement type, a closed hydraulic circuit interconnecting the hydraulic pump and the hydraulic motor, and a device for selectively making and breaking the hydraulic circuit respectively by opening and closing the outlet port. The device comprises a valve body for closing the outlet port, a valve holder for driving the valve body to selectively open and close the outlet port, and a spring for normally urging the valve body in a direction to close the outlet port, the valve body and the valve holder being held in engagement with each other for relative displacement in directions to open and close the outlet port.

31 Claims, 2 Drawing Sheets

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously variable transmission including a hydraulic pump coupled to an input shaft and a hydraulic motor coupled to an output shaft, the hydraulic pump and the hydraulic motor being interconnected by a closed hydraulic circuit.

There have been proposed various hydraulically operated continuously variable transmissions for use in automobiles, including a swash-plate axial-plunger hydraulic pump having a pump cylinder coupled to an input shaft and a plurality of pump plungers slidably disposed in the pump cylinder in an annular pattern around an axis of rotation of the pump cylinder, the hydraulic pump having an outlet port, a swash-plate axial-plunger hydraulic motor having a motor cylinder coupled to an output shaft and a plurality of motor plungers slidably disposed in the motor cylinder in an annular pattern around an axis of rotation of the motor cylinder, the hydraulic motor having an inlet port, and a closed hydraulic circuit interconnecting the hydraulic pump and the hydraulic motor. Power is transmitted by the transmission through relative rotation between the motor cylinder and the pump cylinder.

As disclosed in Japanese Patent Publication No. 56-50142, for example, such a continuously variable transmission is controlled such that the transmission ratio will be 1:1 while minimizing or eliminating the angle of inclination of the swash plate of the motor.

By breaking the hydraulic circuit which interconnects the outlet port of the hydraulic pump and the inlet port of the hydraulic motor, the pump plungers can be locked in the pump cylinder to prevent the pump cylinder and the swash plate of the pump from being relatively displaced and to drive the motor cylinder mechanically through the pump swash plate. With the hydraulic motor and pump thus mechanically locked, the oil pressure discharged by the hydraulic pump is prevented from acting on the motor plungers to reduce the thrust load on the motor swash plate and also to reduce oil leakage from between the motor plungers and the motor cylinder.

Where a shoe is mounted on the distal ends of the motor plungers and a hydraulic pressure is introduced to the sliding surface of the shoe for balancing the hydraulic pressures, the hydraulic pressure on the sliding surface of the shoe can be lowered and any oil leakage can be reduced by breaking the hydraulic circuit.

It is known that it is possible to improve the power transmission efficiency of the transmission and increase the durability of the transmission by breaking the hydraulic circuit between the hydraulic pump and the hydraulic motor.

When the hydraulic circuit is broken by a circuit making/breaking device at the time the transmission ratio is minimal, since the volumetric efficiency becomes higher than before the circuit is broken, the engine rotational speed is lowered as indicated by the following equations:

$$\frac{\text{Volumetric}}{\text{efficiency}} = \frac{\text{Output shaft speed}}{\text{Input shaft speed}} \times \text{Transmission ratio} \times 100 (\%)$$

i.e., $$\frac{\text{Input}}{\text{shaft speed}} = \frac{\text{Output shaft speed}}{\text{Volumetric efficiency}} \times \text{Transmission ratio} \times 100 (\%)$$

Therefore, if the hydraulic circuit is broken when the pressure of operating oil is high, i.e., the engine load is relatively high, the engine rotational speed is abruptly lowered, producing a shock that can be felt by the driver, and the smooth running, as it is felt by the driver, of the vehicle is impaired.

SUMMARY OF THE INVENTION

In view of the aforesaid drawback of the prior art, it is an object of the present invention to provide a hydraulically operated continuously variable transmission which is capable of reducing an abrupt decrease that would be caused in the rotational speed of an engine the instant the hydraulic circuit is broken.

According to the present invention, the above object can be achieved by a hydraulically operated continuously variable transmission comprising an input shaft, a hydraulic pump coupled to the input shaft and having an outlet port, an output shaft, a hydraulic motor coupled to the output shaft, at least one of the hydraulic pump and the hydraulic motor being of the variable-displacement type, a closed hydraulic circuit interconnecting the hydraulic pump and the hydraulic motor, and a device for selectively making and breaking the hydraulic circuit respectively by opening and closing the outlet port, the device comprising a valve body for closing the outlet port, a valve holder for driving the valve body to selectively open and close the outlet port, and spring means for normally urging the valve body in a direction to close the outlet port, the valve body and the valve holder being held in engagement with each other for relative displacement in directions to open and close the outlet port.

The outlet port of the hydraulic pump is closed under the force of the spring means which is counteracted by the force applied by the oil pressure from the outlet port to the valve body to open the outlet port. Therefore, the transition into the condition in which the hydraulic pump and the hudraulic motor are locked together by closing the outlet port can smoothly and slowly be effected. The engine rotational speed is thus prevented from being abruptly lowered.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
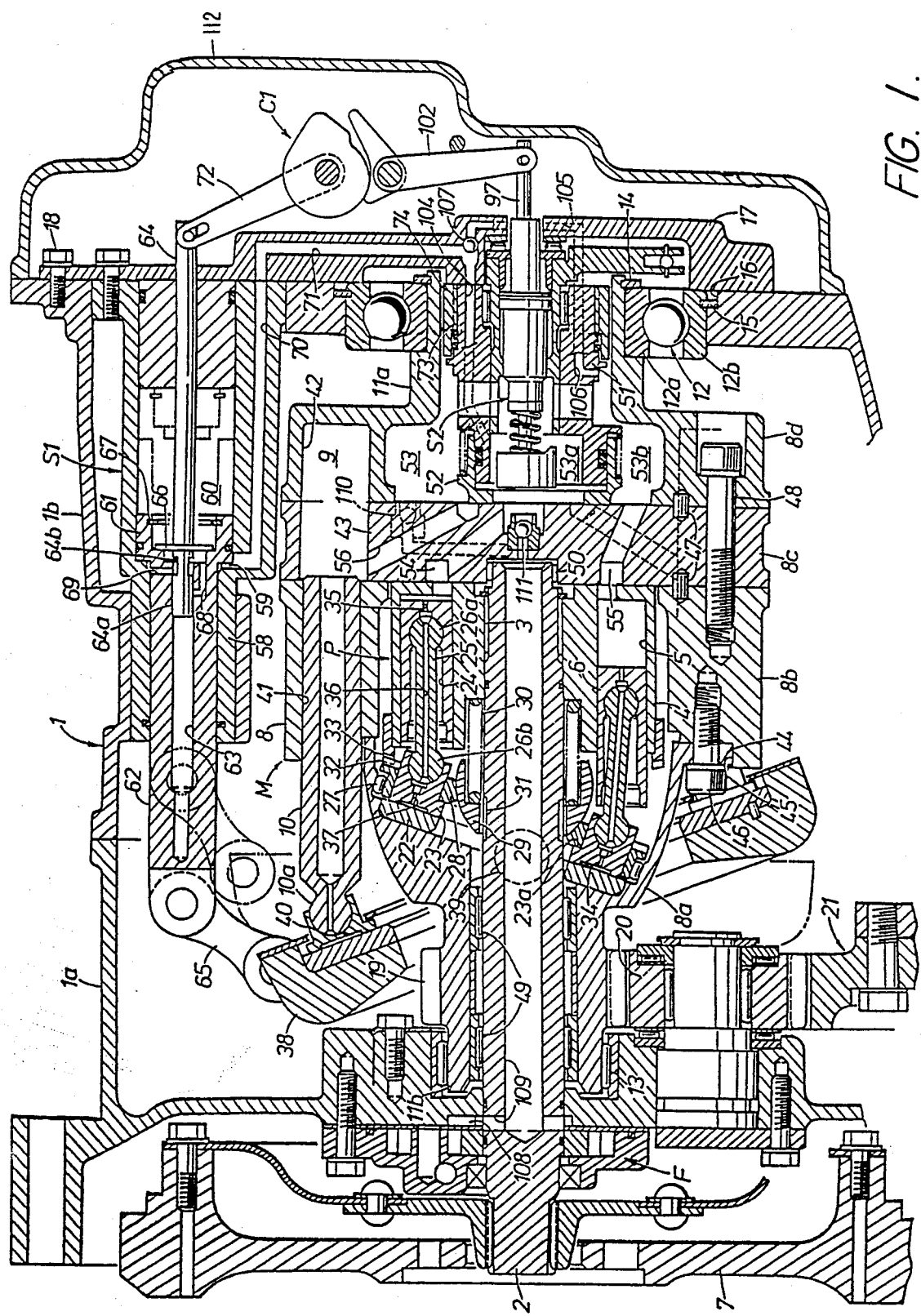
FIG. 1 is a longitudinal cross-sectional view of a hydraulically operated continuously variable transmission according to the present invention.

FIG. 1 shows a hydraulically operated continuously variable transmission for use in a motor vehicle such as an automobile according to the present invention, the transmission basically comprising a hydraulic pump P and a hydraulic motor M housed in a transmission case 1 composed of a pair of longitudinally separated case members 1a, 1b.

The hydraulic pump P has a pump cylinder 4 splined to an end 3 of an input shaft 2, a plurality of cylinder holes or bores 5 defined in the pump cylinder 4 in a circular pattern around and concentric with the input shaft 2 and extending parallel to the input shaft 2, and a plurality of pump plungers 6 slidably fitted respectively in the cylinder holes 5. The hydraulic pump P can be driven by the power of an engine (not shown) which is transmitted through a flywheel 7 coupled to the opposite end of the input shaft 2.

The hydraulic motor M has a motor cylinder 8 disposed in surrounding relation to the pump cylinder 4, a plurality of cylinder holes or bores 9 defined in the motor cylinder 8 in a circular pattern around and concentric with the input shaft 2 and extending parallel to the input shaft 2, and a plurality of motor plungers 10 slidably fitted respectively in the cylinder holes 9. The hydraulic motor M is rotatable relatively to the pump cylinder 4 in concentric relation thereto.

The motor cylinder 8 has axially opposite ends on which a pair of support shafts 11a, 11b is disposed, respectively. The support shaft 11a is rotatably supported on the axial end wall of the case member 1b by means of a ball bearing 12, and the support shaft 11b is rotatably supported on the axial end wall of the case member 1a by means of a needle bearing 13.

The ball bearing 12 has an inner race 12a and an outer race 12b. The support shaft 11a has an outer end projecting beyond the inner race 12a and on which a stop ring 14 is mounted. Another stop ring 15 is mounted on an outer peripheral surface of the outer race 12b near an outer end thereof, and is received in an annular recess 16 defined in an outer surface of the axial end wall of the case member 1b. A holder plate 17 held against an outer end surface of the outer race 12b is fixed by bolts 18 to the axial end wall of the case member 1b. The ball bearing 12 and the support shaft 11a are thus fixedly mounted on the case member 1b against axial movement.

The other support shaft 11b has an integral gear 19 meshing with an idler gear 20 for transmitting output power of the hydraulic motor M therethrough to a differential gear mechanism 21.

A pump swash plate 22 inclined at an angle to the pump plungers 6 is fixedly disposed radially inwardly of the motor cylinder 8. An annular pump shoe 23 is rotatably slidably supported on an inclined surface of the pump swash plate 22.

Each of the pump plungers 6 has a bottomed hole 24 opening toward the pump swash plate 22. A connecting rod 25 is inserted in each pump plunger 6 and pivotally movable with respect to the pump plunger 6 by means of a ball joint 26a on the inner end of the connecting rod 25. The connecting rod 25 projects out of the corresponding pump plunger 6 from the bottomed hole 24, and is pivotally movable with respect to the pump shoe 23 by means of a ball joint 26b on the outer projecting end of the connecting rod 25.

The annular pump shoe 23 has its outer peripheral surface supported in the motor cylinder 8 by a needle bearing 27. The annular pump shoe 23 has an annular step 23a defined in its inner peripheral surface facing the pump plungers 6. A presser ring 28 riding in the annular step 23a presses the pump shoe 23 toward the pump swash plate 22 under the resiliency of a compression coil spring 30 disposed under compression around the input shaft 2 and acting on a spring holder 29 held against the presser ring 28. The spring holder 29 is slidably fitted over splines 31 on the input shaft 2, and has a partly spherical surface contacting a complementary partly spherical surface of the presser ring 28. Therefore, the spring holder 29 is neatly held against the presser ring 28 for transmitting the resilient force from the spring 30 to the presser ring 28 irrespective of how the spring holder 29 and the presser ring 28 are relatively positioned.

Thus, the pump shoe 23 can be slidingly rotated in a fixed position on the pump swash plate 22 at all times.

Bevel gears 32, 33, which have the same number of teeth, are fixed respectively to the confronting surfaces of the pump shoe 23 and the pump cylinder 4 and are held in mesh with each other. When the pump cylinder 4 is driven to rotate by the input shaft 2, the pump shoe 23 is rotated in synchronism with the pump cylinder 4 through the meshing bevel gears 32, 33. On rotation of the pump shoe 23, those pump plungers 6 which run along an ascending side of the inclined surface of the pump swash plate 22 are moved in a discharge stroke by the pump swash plate 22, the pump shoe 23, and the connecting rods 25, and those pump plungers 6 which travel along a descending side of the inclined surface of the pump swash plate 22 are moved in a suction stroke.

During the above operation, paths followed by the centers of the ball joints 26a, 26b on the opposite ends of the connecting rods 25 do not lie in the same cylindrical plane because of the inclination of the pump swash plate 22, i.e, the pump shoe 23. Since, however, the connecting rods 25 are pivotally moved about the ball joints 26a in the bottomed holes 24 of the pump plungers 6 according to the different paths of rotation of the ball joints 26a, 26b, the pump plungers 6 can smoothly be slid in the respective cylinder holes 5. Substantially one half of the pump plungers 6 are always in the discharge stroke, and hence corresponding one half of the pump shoe 23 is pressed against the pump swash plate 22 by the connecting rods 25 under a high hydraulic pressure developed in oil chambers defined in the pump cylinder 4 behind the pump plungers 6. At the same time, the other half of the pump shoe 23 is also subjected to the same high hydraulic pressure. Accordingly, the entire sliding surface of the pump shoe 23 is pressed against the pump swash plate 22 at all times, and remains closely in contact with the pump swash plate 22 without the danger of being lifted off eve when an abrupt pressure drop is developed for some reason in oil chambers behind those pump plungers 6 which operate in the suction stroke.

The pump shoe 23 has hydraulic pockets 34 defined in its surface held against the pump swash plate 22 and positioned in alignment with the respective connecting rods 25. The hydraulic pockets 34 communicate with the respective oil chambers in the pump cylinder 4 through oil holes 35 defined in the pump plungers 6, oil holes 36 defined in the connecting rods 25, and oil holes 37 defined in the pump shoe 23. While the pump cylinder 4 is in operation, therefore, oil under pressure in the pump cylinder 4 is supplied to the hydraulic pockets 34 to apply a hydraulic presssure to the pump shoe 23 in a direction to bear the thrust force imposed by the pump plungers 6 on the pump shoe 23. Therefore, the oil supplied to the hydraulic pockets 34 serves to reduce the pressure under which the pump shoe 23 contacts the pump swash plate 22, and also to lubricate the mutually sliding surfaces of the pump shoe 23 and the pump swash plate 22.

A motor swash plate 38 is tiltably supported in the transmission case 1 by means of a pair of trunnions 39 projecting from opposite sides of the motor swash plate 38, which is held in confronting relation to the motor plungers 10. The motor swash plate 38 has an inclined surface on which there is slidably disposed a motor shoe 40 that is pivotally coupled to ball joints 10a on the outer ends of the motor plungers 10.

Each of the motor plungers 10 reciprocally moves in expansion and compression strokes while rotating the motor cylinder 8. The stroke of the motor plungers 10 can continuously be adjusted from zero to a maximum level by varying the angle of inclination of the motor swash plate 38 from a vertical position (shown by the two-dot-dash lines) in which the motor swash plate 38 lies perpendicularly to the motor plungers 10 to a most inclined position (shown by the solid lines).

The motor cylinder 8 comprises axially separate first through fourth members or segments 8a through 8d. The first member 8a includes the support shaft 11b and accommodates the pump swash plate 22. The second member 8b has guide holes 41 in the cylinder holes 9, in which the motor plungers 10 are slidably guided, respectively. The third and fourth members 8c, 8d have oil chambers 42 in the cylinder holes 9, the oil chambers 42 being slightly larger in diameter than the guide holes 41. The third member 8c serves as a distribution member 43 having oil passages leading to the cylinder holes 5, 9, and the fourth member 8d includes the support shaft 11a.

The first member 8a has an integral joint flange 44 on its end facing the second member 8b. The joint flange 44 is fitted relatively tightly in a positioning hole 45 defined in the end face of the second member 8b that confronts the joint flange 44. The joint flange 44 is fastened to the second member 8b by means of a plurality of bolts 46. The second, third, and fourth members 8b, 8c, 8d are relatively positioned by knock pins 47 fitted in positioning holes defined in their confronting end faces, and are firmly coupled together by means of a plurality of bolts 48.

The input shaft 2 has an outer end portion rotatably supported centrally in the support shaft 11b of the motor cylinder 8 by a needle bearing 49, and an inner end portion rotatably supported centrally in the distribution member 43 by a needle bearing 50.

The spring 30 is disposed under compression between the pump cylinder 4 and the spring holder 29 for pressing the pump cylinder 4 against the distribution member 43 to prevent oil from leaking from between the sliding surfaces of the pump cylinder 4 and the distribution member 43. The resilient force of the spring 30 is also effective in supporting the spring holder 29, the presser ring 28, the pump shoe 23, and the pump swash plate 22 firmly in the motor cylinder 8, as described above.

The support shaft 11a is of a hollow structure in which a fixed shaft 51 is centrally inserted. A distribution ring 52 is fitted over the inner end of the fixed shaft 51 in a fluid-tight manner through an O-ring therebetween. The distribution ring 52 has an axial end face held eccentrically in sliding contact with the distribution member 43. The fourth member 8d of the motor cylinder 8 has an interior hollow space 53 which is divided by the distribution ring 52 into an inner oil chamber 53a and an outer oil chamber 53b.

The distribution member 43 has an outlet port 54 and an inlet port 55. The outlet port 54 provides fluid communication between the cylinder holes 5 that receive the pump plungers 6 operating in the discharge stroke and the inner oil chamber 53a. The inlet port 55 provides fluid communication between the cylinder holes 5 that receive the pump plungers 6 operating in the suction stroke and the outer oil chamber 53b. The distribution member 43 also has a number of communication ports 56 defined therein and through which the cylinder holes 9 of the motor cylinder 8 communicate with the interior space 53 in the fourth member 8d. The communication ports 56 open into the interior space 53 at equally spaced locations on a circle around the axis of rotation of the hydraulic motor M. Since the distribution ring 52 is held in sliding contact with the distribution member 43 in eccentric relationship, as described above, the communication ports 56 successively communicate with the inner and outer oil chambers 53a, 53b as the motor cylinder 8 rotates.

Therefore, a closed hydraulic circuit is formed between the hydraulic pump P and the hydraulic motor M through the distribution member 43 and the distribution ring 52. When the pump cylinder 4 is driven by the input shaft 2, high-pressure working oil discharged by the pump plungers 6 in the discharge stroke flows from the outlet port 54, the inner oil chamber 53a, and the communication ports 56 communicating with the inner oil chamber 53a into the cylinder holes 9 receiving the motor plungers 10 which are in the expansion stroke, thereby imposing a thrust on these motor plungers 10.

Working oil discharged by the motor plungers 10 operating in the compression stroke flows through the communication ports 56 communicating with the outer oil chamber 53b and the inlet port 55 into the cylinder holes 5 receiving the pump plungers 6 in the suction stroke. Upon such circulation of the working oil, the motor cylinder 8 is driven by the sum of the reactive torque applied by the pump plungers 6 in the discharge stroke to the motor cylinder 8 through the pump swash plate 22 and the reactive torque received by the motor plungers 10 in the expansion stroke from the motor swash plate 38.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} = 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M from zero to a certain value.

Since the displacement of the hydraulic motor M is determined by the stroke of the motor plungers 10, the transmission ratio can continuously be adjusted from 1 to a certain value by tilting the motor swash plate 38 from the vertical position to a certain inclined position.

A hydraulic ratio-changing servomotor S1 for tilting the motor swash plate 38 is disposed in an upper portion of the transmission case 1. The ratio-changing servomotor S1 comprises a servo cylinder 58 fixed to the transmission case 1, a servo piston 61 movably disposed in the servo cylinder 58 and dividing the interior space of the servo cylinder 58 into a lefthand oil chamber 59 and a righthand oil chamber 60, a piston rod 62 integral with the servo piston 61, and a rod-shaped first pilot valve 64 slidably fitted in a valve hole 63 defined in the piston rod 62 and extending from an end face of the servo piston 61.

The piston rod 6 integral with the servo piston 61 extends through the servo cylinder 58 and has an end projecting into the transmission case 1. The projecting end of the piston rod 62 is coupled to the motor swash plate 38 through a connector 65 and pivot pins.

The first pilot valve 64 has on its distal end a land 64a intimately fitted in the valve hole 63 and also has a pair of diametrically opposite recesses 64b defined behind the land 64a and extending over a certain axial dimension. A retaining ring 66 is securely fitted over the first pilot valve 64 behind the recess 64b. The retaining ring 66 is engageable with a retaining ring 67 fixed to the inner peripheral surface of the servo piston 61 to prevent the first pilot valve 64 from being detached from the piston rod 62.

The piston rod 62 and the servo piston 61 have a lower discharge passage 68 defined therein for communicating the righthand oil chamber 60 through the valve hole 63 with an oil tank (not shown) upon rightward movement of the first pilot valve 64, and an upper communication passage 69 defined therein for communicating the righthand oil chamber 60 with the lefthand oil chamber 59 upon leftward movement of the first pilot valve 64.

The lefthand oil chamber 59 of the servo cylinder 58 communicates with the interior space 53 of the fourth member 8d through an oil passage 70 defined in a peripheral wall of the servo cylinder 58 and an oil passage 71 defined in the holder plate 17. Therefore, the lefthand oil chamber 59 can be supplied with oil under pressure from the hydraulic pump P.

When the first pilot valve 64 is moved to the right from the illustrated position, the land 64a closes the upper communication passage 69 and opens the lower discharge passage 68 at the same time. Therefore, oil under pressure flowing from the hydraulic pump P through the oil passages 71, 70 acts only in the lefthand oil chamber 59, moving the servo piston 61 to the right.

When the first pilot valve 64 is moved to the left, the land 64a opens the communication passage 69 into the righthand oil chamber 60 and closes the discharge passage 68, as shown in FIG. 1. Therefore, the oil under pressure from the hydraulic pump P acts in both the oil chambers 59, 60, whereupon the servo piston 61 is moved to the left due to the difference between pressure-bearing areas of these oil chambers.

When the first pivot valve 64 is stopped on its movement to the right or left, the servo piston 61 is also stopped inasmuch as it is hydraulically floating due to the pressure balancing between the oil chambers 59, 60.

In this manner, the servo piston 61 is operated in amplified movement by following the movement of the first pilot valve 64 under the working oil pressure from the interior space 53. In response to movement of the servo piston 61, the motor swash plate 38 can continuously be angularly shifted or adjusted from the most inclined position indicated by the solid lines in FIG. 1 where the transmission ratio is maximum to the least inclined position indicated by the imaginary (two-dot-and-dash) lines where the transmission ratio is minimum.

The outer end of the first pilot valve 64 projecting through the holder plate 17 is coupled to a first link arm 72 connected to a cam mechanism C1, the first link arm 72 being remotely controlled by a control device (not shown).

Figure 2:
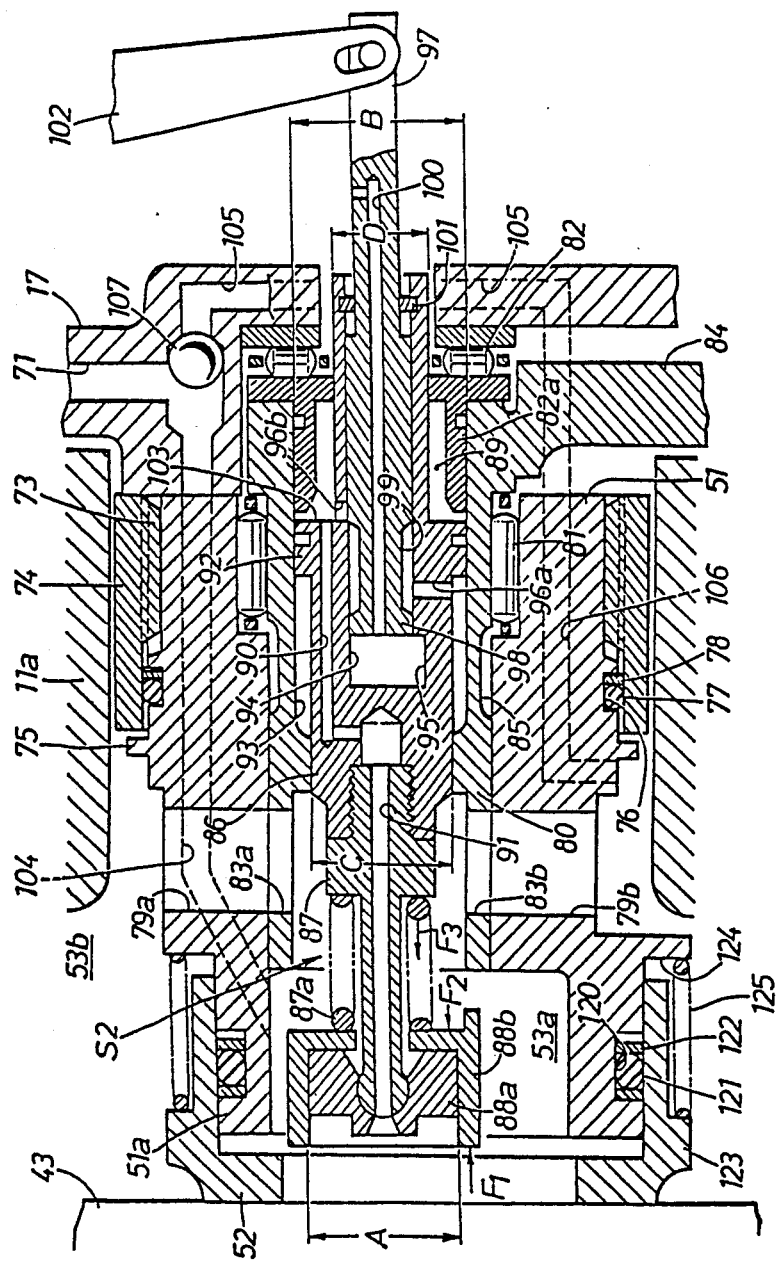
FIG. 2 is an enlarged cross-sectional view of a servomotor for selectively connecting and disconnecting or making or breaking, a hydraulic circuit in the hydraulically operated continuously variable transmission shown in FIG. 1.

As better illustrated in FIG. 2, a cylindrical bearing 74 is coupled to the outer peripheral surface of the fixed shaft 51 through splines 73 having relatively large dimensional tolerances in the radial direction. The bearing 74 has its outer peripheral surface slightly spaced from the inner peripheral surface of the support shaft 11a. This spacing between the bearing 74 and the support shaft 11a is uniformized by a film of working oil throughout the entire circumference of the bearing 74 so that the bearing 74 is floatingly supported in the support shaft 11a.

The fixed shaft 51 has an annular ridge 75 projecting radially outwardly and extending circumferentially in a position confronting an axially inner end of the bearing 74. The bearing 74 is limited in its axial movement between the annular ridge 75 and an inner surface of the holder plate 17 fixed to the outer end surface of the transmission case member 1b.

Near the annular ridge 75, there are no splines present between the bearing 74 and the fixed shaft 51, but an annular groove 76 is defined in the outer peripheral surface of the fixed shaft 51. The annular groove 76 receives therein an O-ring 77 and a backup ring 78 both serving as seal members.

The fixed shaft 51 is of a hollow construction having a peripheral wall having radial connecting ports 79a, 79b through which the inner and outer oil chambers 53a, 53b communicate with each other. A cylindrical clutch valve 80 is fitted in the interior space of the fixed shaft 51 for selectively opening and closing the ports 79a, 79b. The clutch valve 80 serves as a clutch for selectively connecting and disconnecting the hydraulic pump P and the hydraulic motor M.

The clutch valve 80 is positioned by a radial needle bearing 81 radially with respect to the fixed shaft 51 and also positioned by a thrust needle bearing 82 axially with respect to the holder plate 17. The clutch valve 80 thus radially and axially positioned is rotatable with respect to the fixed shaft 51. The clutch valve 80 has radial connecting holes 83a, 83b defined in the peripheral wall at its inner end, the holes 83a, 83b being capable of registration with the ports 79a, 79b, respectively. A swing link 84 coupled to a clutch control device (described later) is joined to the outer end of the clutch valve 80. The relative position of the holes 83a, 83b with respect to the ports 79a, 79b can be changed by turning the link 84. When the ports 79a, 79b are fully opened in full registry with the holes 83a, 83b, respectively, the clutch is in an "OFF" position. When the ports 79a, 79b are partly opened by shifting the holes 83a, 83b, the clutch is in a "partly ON" position. When the ports 79a, 79b are fully closed out of full registry with the holes 83a, 83b, respectively, the clutch is in an "ON" position. With the clutch OFF as shown, working oil discharged from the outlet port 54 into the inner oil chamber 53a flows through the ports 79a, 79b and the outer oil chamber 53b directly into the inlet port 55, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 80 has a relief groove 85 defined in its outer peripheral surface near the radial needle bearing 81 to prevent sluggish rotation of the clutch valve 80 even when the fixed shaft 51 is flexed.

A servomotor S2 for selectively making and breaking the hydraulic circuit is disposed centrally in the hollow clutch valve 80. The servomotor S2 has a piston shaft 86 slidably fitted in the central hole of the clutch valve 80, and a valve rod 87 threaded in one end of the piston shaft 86. The valve rod 87 has a partly spherical end of a reduced diameter on which a shoe guide 88a is pivotally mounted.

A bottomed cylindrical shoe 88b is fitted over the shoe guide 88a slidably along the axis of the valve rod 87. A coil spring 87a is disposed under compression between the outer bottom surface of the shoe 88b and the proximal end of the valve rod 87 for normally urging the shoe 88b outwardly in the axial direction.

When the piston shaft 86 is slid to the left in FIG. 2, the shoe 88b closes a confronting open end of the outlet port 54 of the distribution member 43 in a fluid-tight manner for thereby cutting off the flow of working oil from the outlet port 54 into the inner oil chamber 53a. With the oil flow thus cut off, the pump plungers 6 are hydraulically locked and the hydraulic pump P and the hydraulic motor M are directly connected to each other, so that the motor cylinder 8 can mechanically be driven by the pump cylinder 4 through the pump plungers 6 and the pump swash plate 22. The hydraulic pump P and the hydraulic motor M are directly interconnected in this manner when the motor swash plate 38 is vertically positioned for the minimum transmission ratio. In this transmission position, the efficiency of transmission of power from the input shaft to the output shaft is increased, and the thrust applied by the motor plungers 10 to the motor swash plate 38 is reduced, thus lessening the stresses on the bearings and other members.

The piston shaft 86 has an outer end portion of smaller diameter defining an oil chamber 89 between itself and an inner member 82a of the thrust needle bearing 82 which supports the clutch valve 80. The oil chamber 89 is normally held in communication with the inner oil chamber 53a through an oil passage 90 defined axially in the piston shaft 86 and an oil passage 91 defined axially centrally in the valve rod 87 in communication with the oil passage 90. When the engine is driven, a portion of the high-pressure working oil circulating between the hydraulic pump P and the hydraulic motor M is normally supplied to the oil chamber 89 through the oil passages 91, 90.

The piston shaft 86 has an integral piston 92 on its axially intermediate portion. An annular chamber 93 is defined axially leftwardly of the piston 92 and radially between the inner peripheral surface of the central hole of the clutch valve 80 and the outer peripheral surface of the piston shaft 86. The piston shaft 86 also has a central blind hole 94 extending from the outer end toward an axial position beyond the piston 92, the central blind hole 94 including a relief groove 95 defined in an inner peripheral surface of the piston shaft 86 at the inner end of the blind hole 94. The blind hole 94 and the annular chamber 93 communicate with each other through a radial hole 96a defined in the piston shaft 86 near the inner end of the piston 92. The outer end portion of the piston rod 86 has a hole 96b defined near the outer end of the piston 92 and providing communication between the oil chamber 89 and the blind hole 94.

A rod-shaped second pilot valve 97 is inserted in the blind hole 94 and extends through the holder plate 17 secured to the end wall of the transmission case 1. The seond pilot valve 97 has a land 98 on its inner distal end which is slidably held closely against the inner peripheral surface of the blind hole 94, and a smaller-diameter portion 99 positioned rightwardly of the land 98 and having a suitable axial dimension. The second pilot valve 97 also has a central axial hole 100 through which the blind hole 94 is vented to atmosphere. The second pilot valve 97 includes an outer end portion of smaller diameter which extends outwardly from an axially intermediate portion thereof. Outward sliding movement of the second pilot valve 97 is limited when the step at the inner end of the outer end portion of the second pilot valve 97 is engaged by a retaining ring 101 secured to the inner peripheral surface of the piston shaft 86 at its outer end. The second pilot valve 97 can be slidably moved horizontally in FIGS. 1 and 2 by the cam mechanism C1 which is operatively coupled to the outermost end of the second pilot valve 97 through a second link arm 102.

It is assumed here that the end face of the shoe guide 88a has a pressure bearing area A, the piston 92 has a cross-sectional area B, the inner end of the piston shaft 86 has a pressure bearing area C, and the smaller-diameter outer end portion of the piston shaft 86 has a crosssectional area D. These areas A, B, C, D are determined such that they meet the following inequalities:

$A > B - D$ $B - D > C$

When the second pilot valve 97 is moved to the left in FIGS. 1 and 2, the smaller-diameter portion 99 of the second pilot valve 97 is entirely inserted into the blind hole 94 which is located inwardly of the righthand end face 103 of the piston 92. The high-pressure working oil from the outlet port 54 flows through the oil passages 91, 90 into the oil chamber 89 in which the hydraulic pressure acts on the righthand end face 103 of the piston 92. The hydraulic pressure of the working oil in the inner oil chamber 53a also acts on the lefthand end of the piston shaft 86. The piston shaft 86 is now moved to the left because of the inequality: $B - D > C$ since the pressure bearing area of the righthand end face 103 of the piston 92 is expressed by $B - D$ and the pressure bearing area of the inner end face of the piston shaft 86 is expressed by C. The piston shaft 86 is moved leftwardly until the shoe 88b engages the distribution member 43 to close the open end of the outlet port 54, whereupon the hydraulic pump P and the hydraulic motor M are directly interconnected.

Inasmuch as the shoe 88b is floatingly held in engagement with the shoe guide 88a by the coil spring 87a, the outlet port 54 is closed under the internal pressure F2 acting in the inner oil chamber 53a on the righthand end of the shoe 88b and the spring load F3 of the coil spring 87a, which are counteracted by the opening force F1 produced by the oil pressure discharged by the pump P and acting on the lefthand end of the shoe 88b. In this case, the internal pressure in the inner oil chamber 53a is determined by the relationship between oil pressure discharged from the pump P and the spring load of the coil spring 87a, and the spring load varies with the amount by which the coil spring 87a is compressed. Therefore, where the oil pressure discharged from the pump P is constant, the internal pressure in the inner oil chamber 53a gradually varies dependent on the flexing of the coil spring 87a.

When the outlet port 54 is closed, the high hydraulic pressure from the outlet port 54 (which is equal to the hyrdaulic pressure in the oil chamber 89) is exerted on the end face of the shoe guide 88a which has the pressure bearing area A, and the high hydraulic pressure in the oil chamber 89 acts on the righthand end face 103 of the piston 92 which has the pressure bearing area B−D. Inasmuch as A>B−D, the shoe guide 88a is subjected to a force tending to move the same to the right. The shoe guide 88a is therefore moved slightly to the right. When the shoe guide 88a is moved to the right even slightly, the spring load on the end face of the shoe 88b is lowered, whereupon the force tending to separate the shoe 88b is increased. The pressure difference between the oil pressure discharged from the pump P and the internal pressure in the inner oil chamber 53a is reduced, thus forcing the shoe 88b against the end face of the distribution member 43 again.

By selecting the areas A, B, C, D to meet the above inequalities, therefore, the shoe 88b can be maintained in a hydraulically floating condition in which any oil leakage from between the shoe 88b and the outlet port 54 is reduced to a minimum, and the hydraulic motor M and the hydraulic pump P remain locked together. With the coil spring 87a being of a suitably selected spring constant, the outlet port 54 can be gradually closed, so that any shock resulting from a reduction in the engine rotational speed can be reduced.

When the second pilot valve 97 is moved to the right, the smaller-diameter portion 99 of the second pilot valve 97 is displaced to the right beyond the righthand end face 103 of the piston 92, and the space around the samller-diameter portion 99 communicates with the hole 96b in the smaller-diameter end portion of the piston shaft 86. The high-pressure working oil therefore acts on the righthand end face 103 of the piston 92 and the inner end face of the piston shaft 86, and also acts on the lefthand end face of the piston 92 through the hole 96b, the space around the smaller-diameter portion 99, the hole 96a, and the annular chamber 93. At this time, the pressure-bearing area for moving the piston shaft 86 to the left is indicated by B−D, whereas the pressure-bearing area for moving the piston shaft 86 to the right is indicated by B. Since B>B−D, the piston shaft 86 is moved rightwardly, unlocking the hydraulic motor M and the hydraulic pump P from each other.

The fixed shaft 51 has on its inner end an eccentric shaft 51a disposed eccentrically with respect to the input shaft 2 toward the group of cylinder holes in the suction stroke. The eccentric shaft 51a has an annular groove 120 defined in the outer peripheral surface near the free end thereof, with an O-ring 121 and a backup ring 122 disposed in the annular groove 120. The distribution ring 52 is fitted over the eccentric shaft 51a with the O-ring 121 and the backup ring 122 interposed therebetween.

The distribution ring 52 has a radially outward flange 123 on its end held against the distribution member 43. The eccentric shaft 51a has a step 124 on its proximal end. Between the flange 123 and the step 124, a coil spring 125 is disposed under compression for normally urging the distribution ring 52 against the distribution member 43.

The distribution ring 52 is subjected to the pressing force applied by the internal presesure in the inner space 53 to the distribution member 43 and the separating force due to the internal pressure in the cylinder holes 9 of the hydraulic motor M. In order to distribute the oil discharged from the hydraulic pump P to the hydraulic motor M without oil leakage, it is basically necessary that the pressing force be high. The coil spring 125 is effective to provide good sealing capability between the distribution member 43 and the distribution ring 52.

The ratio-changing servomotor S1 is supplied with working oil from either the inner oil chamber 53a through a passage communicating with the inner oil chamber 53a via a first oil passage 104 defined in the fixed shaft 51 or the outer oil chamber 53b through a passage communicating with the outer oil chamber 53b via a second oil passage 105 defined in the holder plate 17 and a third oil passage 106 defined in the fixed shaft 51. Switching between these passages is effected by a ball shuttle valve 107 positioned in a joint space defined in the holder plate 17 between the first and second oil passages 104, 105.

Upon acceleration and when the outlet port 54 of the hydraulic pump P is not closed, the hydraulic pressure in the inner oil chamber 53a is higher than the hydraulic pressure in the outer oil chamber 53b. Therefore, the shuttle valve 107 is shifted to the right to close the open end of the second oil passage 105, communicating only the first oil passage 104 with the oil passsage 71 to supply the working oil from the inner oil chamber 53a to the ratio-changing servomotor S1.

Upon deceleration, or upon acceleration and when the outlet port 54 is closed, the hydraulic pressure in the outer oil chamber 53b is higher than the hydraulic pressure in the inner oil chamber 53a. Thus, the shuttle valve 107 is shifted to the left to close the open end of the first oil passage 104, allowing only the second and third oil passages 105, 106 to communicate with the oil passage 71. As a result, the working oil from the outer oil chamber 53b is supplied to the ratio-changing servomotor S1.

In this manner, the ratio-changing servomotor S1 is supplied with working oil at all times from the higher-pressure side in the closed hydraulic circuit to maintain sufficient hydraulic power required to operate the servomotor S1.

As shown in FIG. 1, a replenishing pump F is mounted on an outer surface of the lefthand case member 1a. The replenishing pump F is driven by the input shaft 2 for feeding working oil from an oil tank (not shown) under a constant pressure. The replenishing pump F has an outlet port 108 communicating through an axial central oil passage 109 defined in the input shaft 2 with the outlet port 54 in the distribution member 43 via a check valve 111 and also with the outer oil chamber 53b via a check valve 110. The replenishing pump F therefore supplies oil to automatically compensate for any oil leakage from the closed hydraulic circuit composed of the hydraulic pump P and the hyraulic motor M.

The cam mechanism C1, the holder plate 17, and other members are covered with an end cover 112 attached to the righthand side end of the transmission case 1.

With the arrangement of the present invention, as described above, the pilot valve and the shoe in the servomotor for selectively making and breaking the hydraulic circuit are resiliently coupled to each other. Therefore, the shoe can be cushioned when it closes the discharge port of the hydraulic pump, and an abrupt reduction in the engine rotational speed can be lessened. The transition into the condition in which the hydraulic motor and the hydraulic pump are locked together can smoothly be effected, and the driving of the automobile as it is felt by the driver is improved.

Although a certain preferred embodiment has been shown and described, it should be understood that many changes and modifications may be made therein without departing from the scope of the appended claims.

What is claimed is:

1. A hydraulically operated continuously variable transmission comprising:
   an input shaft;
   a hydraulic pump coupled to said input shaft and having an outlet port;
   an output shaft;
   a hydraulic motor coupled to said output shaft, at least one of said hydraulic pump and said hydraulic motor being of the variable-displacement type;
   a closed hydraulic circuit interconnecting said hydraulic pump and said hydraulic motor; and
   a device for selectively making and breaking said hydraulic circuit respectively by opening and closing said outlet port, said device comprising a valve body for closing said outlet port, a valve holder for driving said valve body to selectively open and close said outlet port, and spring means for normally urging said valve body in a direction to close said outlet port, said valve body and said valve holder being held in engagement with each other for relative displacement in directions to open and close said outlet port.

2. A hydraulically operated continuously variable transmission according to claim 1, wherein said hydraulic motor has a member in which said outlet port of the hydraulic pump is defined, said valve body comprising a shoe which can be held against said member to close said outlet port, and said valve holder comprising a shoe guide, said shoe being slidably fitted over said shoe guide.

3. A hydraulically operated continuously variable transmission according to claim 2, wherein said spring means comprises a coil spring acting on said shoe for normally urging said shoe and said shoe guide toward said member.

4. A hydraulically operated continuously variable transmission comprising:
   an input shaft;
   a hydraulic pump coupled to said input shaft and having an outlet port;
   an output shaft;
   a hydraulic motor coupled to said output shaft, at least one of said hydraulic pump and said hydraulic motor being of the variable-displacement type;
   a closed hydraulic circuit interconnecting said hydraulic pump and said hydraulic motor; and
   a device for selectively making and breaking said hydraulic circuit respectively by opening and closing said outlet port, said device comprising valve means hydrodynamically movable toward and away from said outlet port for selectively closing and opening said outlet port, said device operating to break said hydraulic circuit by gradually closing said outlet port.

5. A hydraulically operated continuously variable transmission, comprising:
   an input shaft;
   a hydraulic pump coupled to said input shaft and having an outlet port;
   an output shaft;
   a hydraulic motor coupled to said output shaft, at least one of said hydraulic pump and said hydraulic motor being of the variable-displacement type;
   a closed hydraulic circuit interconnecting said hydraulic pump and said hydraulic motor; and
   a device for selectively making and breaking said hydraulic circuit respectively by opening and closing said outlet port, said closing of said outlet port being performed gradually, said device comprising a valve body for closing said outlet port, a valve holder for driving said valve body to selectively open and close said outlet port, and spring means for normally urging said valve body in a direction to close said outlet port, said valve body and said valve holder being held in engagement with each other for relative displacement in directions to open and close said outlet port.

6. A circuit control valve apparatus in a hydraulically operated continuously variable transmission of the type having a hydraulic pump and a hydraulic motor interconnected by a closed hydraulic circuit, comprising, a valve disposed in said closed hydraulic circuit for locking up said hydraulic pump by stopping the flow of a working oil through said closed hydraulic circuit and closing means for gradually closing said valve.

7. A circuit control valve apparatus according to claim 6, wherein an outlet port of said hydraulic pump is disposed in a distribution member, said valve comprising a shoe for engagement with said distribution member to close said outlet port.

8. A circuit control valve apparatus according to claim 7, wherein said shoe is mounted on said closing means.

9. A circuit control valve apparatus in a hydraulically operated continuously variable transmission of the type having a hydraulic pump and a hydraulic motor interconnected by a closed hydraulic circuit, comprising, a valve disposed in said closed hydraulic circuit for locking up said hydraulic pump by stopping the flow of a working oil through said closed hydraulic circuit and closing means for gradually closing said valve, wherein an outlet port of said hydraulic pump is disposed in a distribution member, said valve comprising a shoe for engagement with said distribution member to close said outlet port, wherein said shoe is slidably fitted over a shoe guide and held in floating engagement with said shoe guide, resilient biasing means being provided for holding said shoe in said floating engagement.

10. A circuit control valve apparatus in a hydraulically operated continuously variable transmission of the type having a hydraulic pump and a hydraulic motor interconnected by a closed hydraulic circuit, comprising, a valve disposed in said closed hydraulic circuit for locking up said hydraulic pump by stopping the flow of a working oil through said closed hydraulic circuit and closing means for gradually closing said valve, wherein an outlet port of said hydraulic pump is disposed in a distribution member, said closing means comprising a hydraulically operated servomotor and resilient biasing means, said valve comprising a shoe for engagement with said distribution member, said shoe being slidably fitted over a shoe guide mounted on said servomotor, said resilient biasing means being disposed against said shoe for urging said shoe toward said distribution member.

11. A circuit control valve apparatus in a hydraulically operated continuously variable transmission of the type having a hydraulic pump and a hydraulic motor interconnected by a closed hydraulic circuit, comprising, a valve disposed in said closed hydraulic circuit for locking up said hydraulic pump by stopping the flow of a working oil through said closed hydraulic circuit and closing means for gradually closing said valve, wherein an outlet port of said hydraulic pump is disposed in a distribution member, said closing means comprising a hydraulically operated servomotor and resilient biasing means, said valve comprising a shoe for engagement with said distribution member, said shoe being slidably fitted over a shoe guide mounted on said servomotor, said resilient biasing means being disposed against said shoe for urging said shoe toward said distribution member, wherein said resilient biasing means comprises a spring.

12. A circuit control valve apparatus in a hydraulically operated continuously variable transmission of the type having a hydraulic pump and a hydraulic motor interconnected by a closed hydraulic circuit, comprising, a valve disposed in said closed hydraulic circuit for locking up said hydraulic pump by stopping the flow of a working oil through said closed hydraulic circuit and closing means for gradually closing said valve, wherein an outlet port of said hydraulic pump is disposed in a distribution member, said closing means comprising a hydraulically operated servomotor and resilient biasing means, said valve comprising a shoe for engagement with said distribution member, said shoe being slidably fitted over a shoe guide mounted on said servomotor, said resilient biasing means being disposed against said shoe for urging said shoe toward said distribution member, wherein said servomotor operates in a first state in which said shoe is moved away from said distribution member to selectively make said closed hydraulic circuit and a second state in which said shoe is moved toward said distribution member to selectively break said closed hydraulic circuit.

13. A circuit control valve apparatus in a hydraulically operated continuously variable transmission of the type having a hydraulic pump and a hydraulic motor interconnected by a closed hydraulic circuit, and an input shaft operatively connected to said hydraulic pump for supplying driving power to said hydraulic pump, comprising, a valve disposed in said closed hydraulic circuit for locking up said hydraulic pump by stopping the flow of a working oil through said closed hydraulic circuit and closing means for gradually closing said valve to prevent shock in said transmission upon interruption of the flow of the working oil.

14. A circuit control valve apparatus in a hydraulically operated continuously variable transmission of the type having a hydraulic pump and a hydraulic motor interconnected through a closed hydraulic circuit, and an outlet port of said hydraulic pump disposed in a distribution member, comprising, a valve body disposed in said closed hydraulic circuit and engageable with said distribution member for locking up said hydraulic pump by stopping the flow of a working oil through said closed hydraulic circuit, and means for gradually moving said valve body to engage said distribution member.

15. A circuit control valve apparatus in a hydraulically operated continuously variable transmission of the type having a hydraulic pump and a hydraulic motor interconnected through a closed hydraulic circuit, and an outlet port of said hydraulic pump disposed in a distribution member, comprising, a valve body disposed in said closed hydraulic circuit and engageable with said distribution member for locking up said hydraulic pump by stopping the flow of a working oil through said closed hydraulic circuit, and means for gradually moving said valve body to engage said distribution member, wherein said valve body comprises a shoe for engagement with said distribution member, said shoe being mounted on said means for gradually moving in such a manner that said shoe is allowed to float along a direction of movement of said valve body when said means for gradually moving moves said valve body to engage said distribution member.

16. A circuit control valve apparatus in a hydraulically operated continuously variable transmission of the type having a hydraulic pump and a hydraulic motor interconnected through a closed hydraulic circuit, and an outlet port of said hydraulic pump disposed in a distribution member, comprising, a valve body disposed in said closed hydraulic circuit and engageable with said distribution member for locking up said hydraulic pump by stopping the flow of a working oil through said closed hydraulic circuit, and means for gradually moving said valve body to engage said distribution member, wherein said valve body comprises a shoe for engagement with said distribution member, said shoe being floatingly mounted on said means for gradually moving, wherein said means for gradually moving comprises moving means for selectively moving said shoe into and out of engagement with said distribution member, a shoe guide mounted on said moving means, and resilient biasing means for urging said shoe toward said distribution member, said shoe being slidably fitted over said shoe guide.

17. A circuit control valve apparatus in a hydraulically operated continuously variable transmission of the type having a hydraulic pump and a hydraulic motor interconnected through a closed hydraulic circuit, and an outlet port of said hydraulic pump disposed in a distribution member, comprising, a valve body disposed in said closed hydraulic circuit and engageable with said distribution member for locking up said hydraulic pump by stopping the flow of a working oil through said closed hydraulic circuit, and means for gradually moving said valve body to engage said distribution member, wherein said valve body comprises a shoe for engagement with said distribution member, said shoe being floatingly mounted on said means for gradually moving, wherein said means for gradually moving comprises moving means for selectively moving said shoe into and out of engagement with said distribution member, a shoe guide mounted on said moving means, and resilient biasing means for urging said shoe toward said distribution member, said shoe being slidably fitted over said shoe guide, wherein said resilient biasing means comprises a spring operatively engaging said shoe.

18. A method for gradually stopping the flow of a working oil in a closed hydraulic circuit in a hydraulically operated continuously variable transmission of the type having a hydraulic pump, a hydraulic motor, a closed hydraulic circuit interconnecting said hydraulic pump and said hydraulic motor, a distribution member with an outlet port of said hydraulic pump defined therein, a valve body for breaking said closed hydraulic circuit by closing said outlet port, and means for selectively moving said valve body toward and away from said distribution member for selectively breaking and making said closed hydraulic circuit, comprising the steps of:

applying a first force to said valve body to resiliently urge said valve body toward said distribution member;

applying a second force to said valve body by oil pressure in an oil chamber, said second force acting to urge said valve body toward said distribution member;

applying a third force to said valve body in a direction in opposition to said first force and said second force by an oil pressure of oil emerging from said hydraulic pump;

moving said valve body toward said distribution member until said third force balances the sum of said first and second forces; and increasing said first force until the sum of said first force and said second force overcomes said third force and said valve body engages said distribution member to stop the flow of said oil in said hydraulic circuit.

19. A method for gradually stopping the flow of oil in a closed hydraulic circuit according to claim 18, wherein the step of moving said valve body occurs relatively rapidly and the step of increasing said first force occurs relatively gradually.

20. A method for gradually stopping the flow of oil in a closed hydraulic circuit according to claim 18, wherein said valve body comprises a shoe resiliently biased toward said distribution member.

21. A circuit control valve apparatus in a hydraulically operated continuously variable transmission of the type having a hydraulic pump, a hydraulic motor, a closed hydraulic circuit interconnecting said hydraulic pump and said hydraulic motor, and an outlet port of said hydraulic pump, comprising, a valve disposed in said closed hydraulic circuit for locking up said hydraulic pump by closing said outlet port, first closing means for moving said valve quickly to a position to almost close said outlet port, and second closing means for moving said valve to gradually close said outlet port after said valve is in a position to almost close said outlet port.

22. A circuit control valve apparatus according to claim 21, wherein said outlet port of said hydraulic pump is disposed in a distribution member, said valve comprising a shoe for engaging said distribution member to close said outlet port.

23. A circuit control valve apparatus according to claim 22, said first closing means comprising a servomotor.

24. A circuit control valve apparatus according to claim 23, said second closing means comprising a shoe guide mounted to said servomotor, said shoe being slidably fitted over said shoe guide, and a resilient biasing means for urging said shoe toward said distribution member.

25. A circuit control valve apparatus according to claim 24, said resilient biasing means comprising a spring.

26. A circuit control valve apparatus according to claim 22, said second closing means comprising a shoe guide mounted to said first closing means, said shoe being slidably fitted over said shoe guide, and a resilient biasing means for urging said shoe toward said distribution member.

27. A circuit control valve apparatus according to claim 26, said resilient biasing means comprising a spring.

28. A method for gradually restricting the flow of a working oil in a closed hydraulic circuit in a hydraulically operated continuously variable transmission of the type having a hydraulic pump, a hydraulic motor, a closed hydraulic circuit interconnecting said hydraulic pump and said hydraulic motor, a distribution member with an outlet port of said hydraulic pump defined therein, a valve body for breaking said closed hydraulic circuit by closing said outlet port, and means for selectively moving said valve body toward and away from said distribution member for selectively breaking and making said closed hydraulic circuit, comprising the steps of:

applying a first force to said valve body to resiliently urge said valve body toward said distribution member;

applying a second force to said valve body by oil pressure in an oil chamber, said second force acting to urge said valve body toward said distribution member;

applying a third force to said valve body in a direction in opposition to said first force and said second force by an oil pressure of oil discharged from said hydraulic pump;

moving said valve body toward said distribution member until said third force balances the sum of said first and second forces; and increasing said first force until the sum of said first force and said second force overcomes said third force and said valve body is moved further toward said distribution member to gradually restrict the flow of said oil in said hydraulic circuit.

29. A method for gradually restricting the flow of a working oil in a closed hydraulic circuit in a hydraulically operated continuously variable transmission of the type having a hydraulic pump, a hydraulic motor, a closed hydraulic circuit interconnecting said hydraulic pump and said hydraulic motor, a distribution member with an outlet port of said hydraulic pump defined therein, a valve body for restricting said flow by closing said outlet port, and means for selectively moving said valve body toward and away from said distribution member, comprising the steps of:

applying a first resilient biasing force to said valve body to resiliently urge said valve body toward said distribution member;

applying a second force to said valve body by oil pressure in an oil chamber, said second force acting to urge said valve body toward said distribution member;

applying a third force to said valve body in a direction in opposition to said first force and said second force by an oil pressure of oil discharged from said hydraulic pump;

moving said valve body toward said distribution member until said third force balances the sum of said first and second forces;

increasing said first force until the sum of said first force and said second force overcomes said third force to move said valve body toward said distribution member; and holding said valve body in floating engagement with said distribution member to restrict the flow of oil in said hydraulic circuit.

30. A method for gradually varying the pressure of a working oil in a closed hydraulic circuit in a hydraulically operated continuously variable transmission of the type having a hydraulic pump, a hydraulic motor, a closed hydraulic circuit interconnecting said hydraulic pump and said hydraulic motor, a distribution member with an outlet port of said hydraulic pump defined therein, an inlet oil passage communicating with said hydraulic motor, an oil chamber communicating said outlet port and said inlet oil passage, a valve body for breaking said closed hydraulic circuit by closing said outlet port, and means for selectively moving said valve body toward and away from said distribution member for selectively breaking and making said closed hydraulic circuit, comprising the steps of:
- applying a first force to said valve body to resiliently urge said valve body toward said distribution member;
- applying a second force to said valve body by oil pressure in said oil chamber, said second force acting to urge said valve body toward said distribution member;
- applying a third force to said valve body in a direction in opposition to said first force and said second force by an oil pressure of oil discharged from said hydraulic pump;
- moving said valve body toward said distribution member until said third force balances the sum of said first and second forces; and
- increasing said first force until the sum of said first force and said second force temporarily overcomes said third force and said valve body moves closer to said distribution member to gradually reduce the pressure in said oil chamber until said third force balances the sum of said first force and said second force.

31. A method for gradually varying the pressure of a working oil in a closed hydraulic circuit in a hydraulically operated continuously variable transmission of the type having a hydraulic pump, a hydraulic motor, a closed hydraulic circuit interconnecting said hydraulic pump and said hydraulic motor, a distribution member with an outlet port of said hydraulic pump defined therein, an inlet oil passage communicating with said hydraulic motor, an oil chamber communicating said outlet port and said inlet oil passage, a valve body for breaking said closed hydraulic circuit by closing said outlet port, and means for selectively moving said valve body toward and away from said distribution member for selectively breaking and making said closed hydraulic circuit, comprising the steps of:
- applying a first force to said valve body to resiliently urge said valve body toward said distribution member;
- applying a second force to said valve body by oil pressure in said oil chamber, said second force acting to urge said valve body toward said distribution member;
- applying a third force to said valve body in a direction in opposition to said first force and said second force by an oil pressure of oil discharged from said hydraulic pump;
- moving said valve body toward said distribution member until said third force balances the sum of said first and second forces; and
- increasing said first force until the sum of said first force and said second force temporarily overcomes said third force and said valve body moves closer to said distribution member to gradually reduce the pressure in said oil chamber to a desired level and said third force balances the sum of said first force and said second force to hold said valve body in floating engagement with said distribution member.

* * * * *